United States Patent
Sun et al.

(10) Patent No.: US 10,788,361 B2
(45) Date of Patent: Sep. 29, 2020

(54) ELECTRONIC DEVICE WITH OBSTRUCTION-SENSING COLOR AMBIENT LIGHT SENSOR

(71) Applicant: Apple Inc., Cupertino, CA (US)

(72) Inventors: Tianbo Sun, Sunnyvale, CA (US);
Brian R. Land, Woodside, CA (US);
Dong Zheng, Los Altos, CA (US);
Serhan O. Isikman, Sunnyvale, CA (US); Venkata Siva Sunil Kumar Reddy Bommu, San Jose, CA (US);
Zhang Jia, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 15/461,302

(22) Filed: Mar. 16, 2017

(65) Prior Publication Data

US 2017/0294173 A1    Oct. 12, 2017

Related U.S. Application Data

(60) Provisional application No. 62/319,201, filed on Apr. 6, 2016.

(51) Int. Cl.
*G01J 1/42* (2006.01)
*G06K 9/46* (2006.01)
(Continued)

(52) U.S. Cl.
CPC .......... *G01J 1/4204* (2013.01); *G06F 3/0304* (2013.01); *G06K 9/4661* (2013.01);
(Continued)

(58) Field of Classification Search
CPC .............. G09G 5/026; G09G 2330/12; G09G 2320/0666; G09G 2354/00; G09G 2320/0233; G09G 2360/144
See application file for complete search history.

(56) References Cited

U.S. PATENT DOCUMENTS 7,446,303 B2   11/2008  Maniam et al.
7,696,964 B2    4/2010  Lankhorst et al.
(Continued)

OTHER PUBLICATIONS

Yu et al., Sensing Ambient Light for User Experience-Oriented Color Scheme Adaptation on Smartphone Displays, SenSys' 15, Nov. 2015, pp. 309-321.

*Primary Examiner* — Amr A Awad
*Assistant Examiner* — Maheen I Javed
(74) *Attorney, Agent, or Firm* — Treyz Law Group, P.C.; G. Victor Treyz; David K. Cole

(57) ABSTRACT

An electronic device may have a housing in which a display is mounted. The display may have an active area in which images are displayed by an array of pixels and an inactive area that is free of pixels. A color ambient light sensor may make color and luminance measurements on ambient light received through an ambient light sensor window in the inactive area of the display or elsewhere in the electronic device. The color ambient light sensor may have color ambient light sensor elements of different colors. The ambient light sensor elements may extend in a row along an edge of the display or may have other configurations. Analog-to-digital converter circuitry and switching circuitry may gather color ambient light sensor measurements and measurements indicative of whether or not the color ambient light sensor has been obscured by an external object from the light sensor elements.

15 Claims, 9 Drawing Sheets

(51) Int. Cl.
 *G09G 5/02* (2006.01)
 *G06F 3/03* (2006.01)
(52) U.S. Cl.
 CPC ..... *G09G 5/026* (2013.01); *G09G 2320/0233* (2013.01); *G09G 2320/0666* (2013.01); *G09G 2330/12* (2013.01); *G09G 2354/00* (2013.01); *G09G 2360/144* (2013.01)

(56) References Cited

U.S. PATENT DOCUMENTS

| | | | |
|---|---|---|---|
| 8,242,430 B2 | 8/2012 | Dyer | |
| 9,336,749 B2 | 5/2016 | Vetsuypens et al. | |
| 9,568,361 B2 * | 2/2017 | Nakata | G01J 1/1626 |
| 2008/0179497 A1 * | 7/2008 | Maniam | G01J 1/18 |
| | | | 250/214 AL |
| 2013/0076712 A1 * | 3/2013 | Zheng | G01J 1/32 |
| | | | 345/207 |
| 2015/0098709 A1 * | 4/2015 | Breuer | G06K 9/34 |
| | | | 398/118 |
| 2016/0269669 A1 * | 9/2016 | Kim | H04N 9/045 |

\* cited by examiner

ELECTRONIC DEVICE WITH OBSTRUCTION-SENSING COLOR AMBIENT LIGHT SENSOR

This application claims the benefit of provisional patent application No. 62/319,201, filed Apr. 6, 2016, which is hereby incorporated by reference herein in its entirety.

FIELD

This relates generally to electronic devices, and, more particularly, to light sensors for electronic devices.

BACKGROUND

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

Ambient light conditions sometimes include significant changes in color. For example, an electronic device may be used in a cool color temperature environment such as outdoor shade or a warm color temperature environment such as an indoor environment that has been lit with incandescent lighting. Content that appears to be correctly displayed on a display in one of these environments may have an unpleasant color cast in the other environment. For example, a display that is properly adjusted in an outdoor environment may appear overly cool under incandescent lighting.

It may be desirable to use ambient light color measurements in operating a device such as a device with a display. If care is not taken, however, the accuracy of color measurements may be adversely affected by operating conditions.

SUMMARY

An electronic device may have a housing in which a display is mounted. The display may have an active area in which images are displayed by an array of pixels and an inactive area that is free of pixels. A color ambient light sensor may make color and luminance measurements on ambient light received through an ambient light sensor window in the inactive area of the display or elsewhere in the electronic device. The color ambient light sensor may have color ambient light sensor elements of different colors. The ambient light sensor elements may extend in a row along an edge of the display so that the ambient light sensor has an elongated shape or may have other configurations.

Analog-to-digital converter circuitry and switching circuitry may gather color ambient light sensor measurements and measurements indicative of whether or not the color ambient light sensor has been obscured by an external object from the light sensor elements. If the light sensor is not obscured, display color and brightness may be adjusted and other actions taken based on measurements from the light sensor.

The analog-to-digital converter circuitry may include analog-to-digital converters each of which has a transimpedance amplifier for converting current from the light sensor elements to a corresponding voltage that is digitized for use by control circuitry in the electronic device. There may be fewer analog-to-digital converter circuits coupled to the color ambient light sensor than light sensor elements in the color ambient light sensor.

The switching circuitry may be configured to operate in an ambient light color measurement mode in which the switching circuitry routes signals to the analog-to-digital converter circuits from respective first sets of the light sensor elements. The switching circuitry may also be configured to operate in a sensor illumination non-uniformity detection mode in which the switching circuitry routes signals to the analog-to-digital converter circuits from respective second sets of the light sensor elements.

DETAILED DESCRIPTION

Electronic devices may be provided with sensors such as color ambient light sensors. A color ambient light sensor may be used to gather color and luminance information on ambient lighting conditions. This information may be used in controlling the operation of an electronic device. For example, display brightness and color may be adjusted to compensate for changes in the color and brightness of ambient light.

Figure 1:
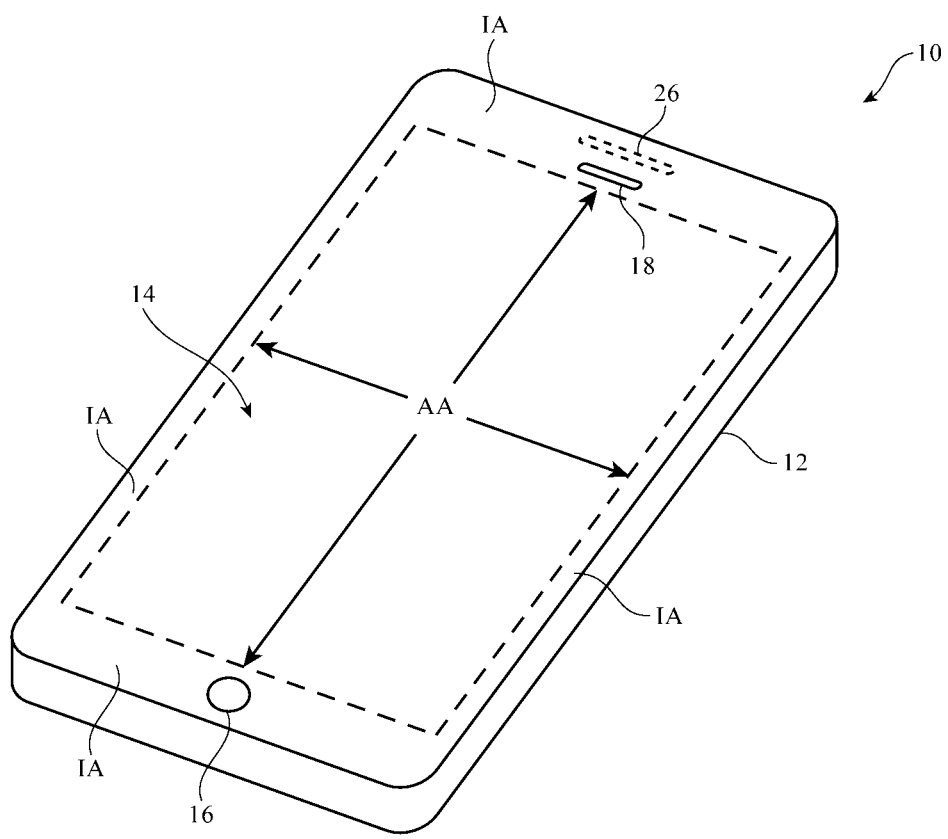
FIG. 1 is a perspective view of an illustrative electronic device in accordance with an embodiment.

FIG. 1 is a perspective view of an illustrative electronic device of the type that may include a color ambient light sensor. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, wristwatch device or other portable computing device. Other configurations may be used for device 10 if desired. The example of FIG. 1 is merely illustrative.

In the example of FIG. 1, device 10 includes display 14. Display 14 has been mounted in housing 12. Electronic device housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads, other transparent conductive structures, or other touch sensor electrode structures.

Display 14 may include an array of pixels formed from liquid crystal display (LCD) components, an array of electrophoretic pixels, an array of plasma display pixels, an array of organic light-emitting diode pixels or other light-emitting diode pixels, an array of electrowetting pixels, or pixels based on other display technologies.

Display 14 may be protected using a display cover layer such as a layer of transparent glass, clear plastic, transparent ceramic, sapphire or other transparent crystalline material, or other transparent layer(s). The display cover layer may have a planar shape, a convex curved profile, a concave curved profile, a shape with planar and curved portions, a layout that includes a planar main area surrounded on one or more edge portions that are bent out of the plane of the planar main area, or other suitable shape. An opening may be formed in the display cover layer to accommodate a speaker port such as speaker port 18. Openings may also be formed in the display cover layer and/or housing 12 to accommodate buttons such as button 16.

Display 14 may have an active area AA that contains an array of pixels that display images. An inactive boarder region such as inactive area IA of FIG. 1 may run along one or more edges of active area AA. Button 16 and speaker port 18 may be located in inactive area IA. To hide internal components in device 10 from view, the underside of the cover layer in inactive area IA may be coated with a layer of black ink or other opaque masking material. If desired, one or more transparent or partly transparent windows may be formed within the opaque masking material (e.g., openings that pass through the opaque masking material to allow light to reach sensors in device 10, openings that are filled with infrared-light-transparent ink so that infrared sensors can make measurements through the cover layer, etc.). As an example, a window such as ambient light sensor window 26 for color ambient light sensor or other light sensor may be formed in the portion of inactive area IA between speaker port 18 and the uppermost edge of housing 12. Ambient light sensor windows such as window 26 may also be formed in other portions of inactive area IA and/or other light transparent areas in device 10 may be formed so that an ambient light sensor such as a color ambient light sensor can make color ambient light sensor measurements for device 10.

Figure 2:
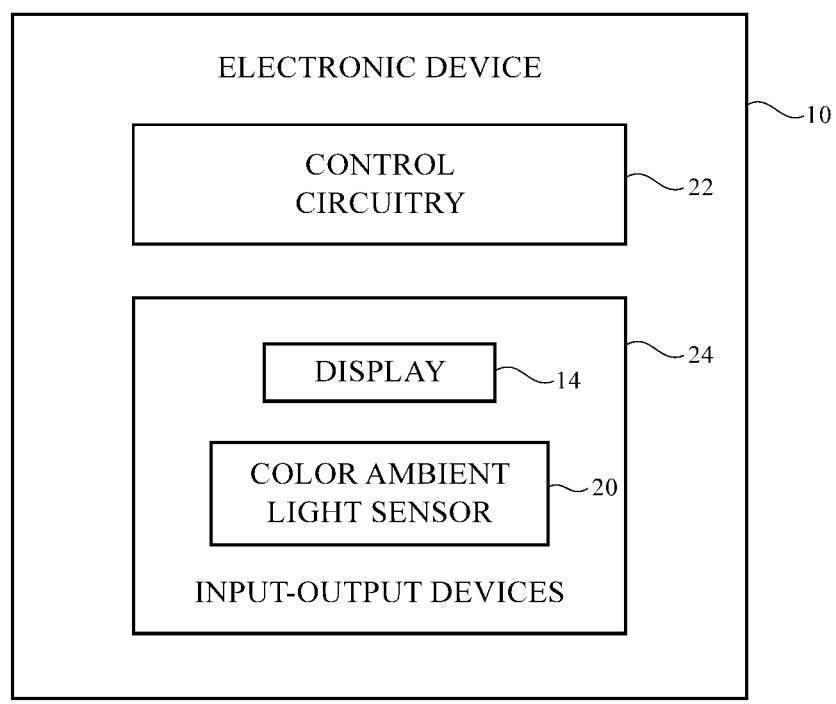
FIG. 2 is a schematic diagram of an illustrative electronic device with sensors in accordance with an embodiment.

FIG. 2 is a schematic diagram of an illustrative electronic device of the type that may be provided with one more color ambient light sensors. As shown in FIG. 2, electronic device 10 may have control circuitry 22. Control circuitry 22 may include storage and processing circuitry for supporting the operation of device 10. The storage and processing circuitry may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. For example, the processing circuitry may adjust the brightness and color (color cast) of display 14 (e.g., to increase display brightness when ambient lighting conditions are bright, to adjust the color of display 14 depending on whether the ambient light around device 10 is cold or warm, etc.). The processing circuitry in control circuitry 22 may be based on one or more microprocessors, microcontrollers, digital signal processors, baseband processors, power management units, audio chips, application specific integrated circuits, etc.

Input-output circuitry in device 10 such as input-output devices 24 may be used to allow data to be supplied to device 10 and to allow data to be provided from device 10 to external devices. Input-output devices 24 may include buttons such as buttons 16 and other buttons, joysticks, scrolling wheels, touch pads, key pads, keyboards, microphones, speakers, tone generators, vibrators or other components with moving parts, cameras, light-emitting diodes and other status indicators, data ports, etc. Input-output devices 24 may include sensors such as magnetic sensors, force sensors, touch sensors, proximity sensors, accelerometers and other sensors for gathering information on orientation and/or position, etc. The sensors in input-output devices 24 may include one or more ambient light sensors that measure ambient lighting conditions. The sensors may, for example, include one or more color ambient light sensors such as color ambient light sensor 20. Color ambient light sensors such as color ambient light sensor 20 may gather color ambient light sensor information such as ambient light sensor color data (e.g., color coordinates and/or color temperature information) and ambient light sensor intensity (luminance) information.

Color ambient light sensor 20 may be mounted in alignment with a color ambient light sensor window in inactive area IA of display 14 such as window 26 of FIG. 1 (as an example). Color ambient light sensor 20 may have multiple sensor elements (sometimes referred to as light detectors or photodiodes) that make light measurements in different respective portions of the light spectrum (sometimes referred to as forming different color channels or sensor elements of different colors). The sensor elements may be formed from discrete components or may be integrated onto a common substrate (e.g., a silicon die).

Figure 3:
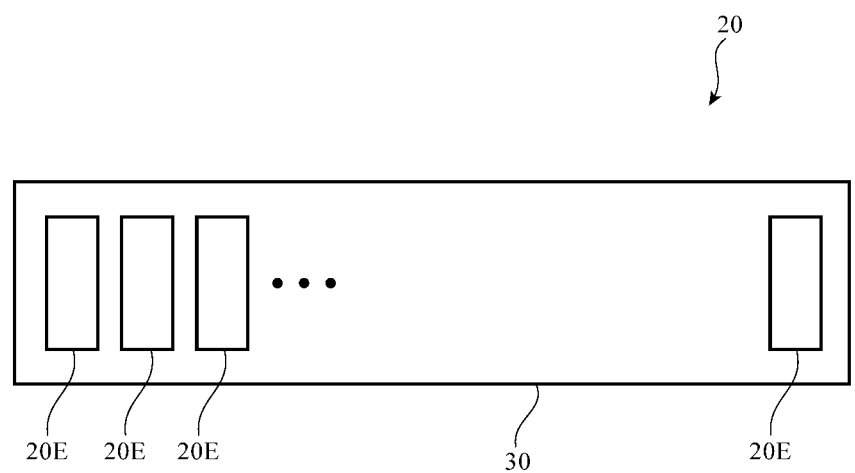
FIG. 3 is a diagram of an illustrative multichannel ambient light sensor in accordance with an embodiment.

As shown in FIG. 3, color ambient light sensor 20 may have multiple color ambient light sensor elements 20E formed in a linear array (i.e., a row) extending along a longitudinal axis on common semiconductor substrate 30

(e.g., a silicon substrate). Each element 20E may be provided with a color filter element of a different color or may otherwise be provided with structures that allow that sensor element to exhibit a different respective sensitivity spectrum (color). If desired, sensor elements 20E may be arranged in two-dimensional arrays, in arrays having rows and columns, in circular shapes, in shapes with a combination of curved and/or straight edges, and/or other patterns. In the example of FIG. 3, light sensor elements 20E have been arranged in an elongated linear array (i.e., a row), so that color light sensor 20 has an elongated shape (strip-shape) of the type suitable for mounting under an elongated window such as illustrative elongated ambient light sensor window 26 of FIG. 1. This is merely illustrative. Color ambient light sensor 20 may have any suitable number of light sensor elements 20E arranged in any suitable pattern.

Figure 4:
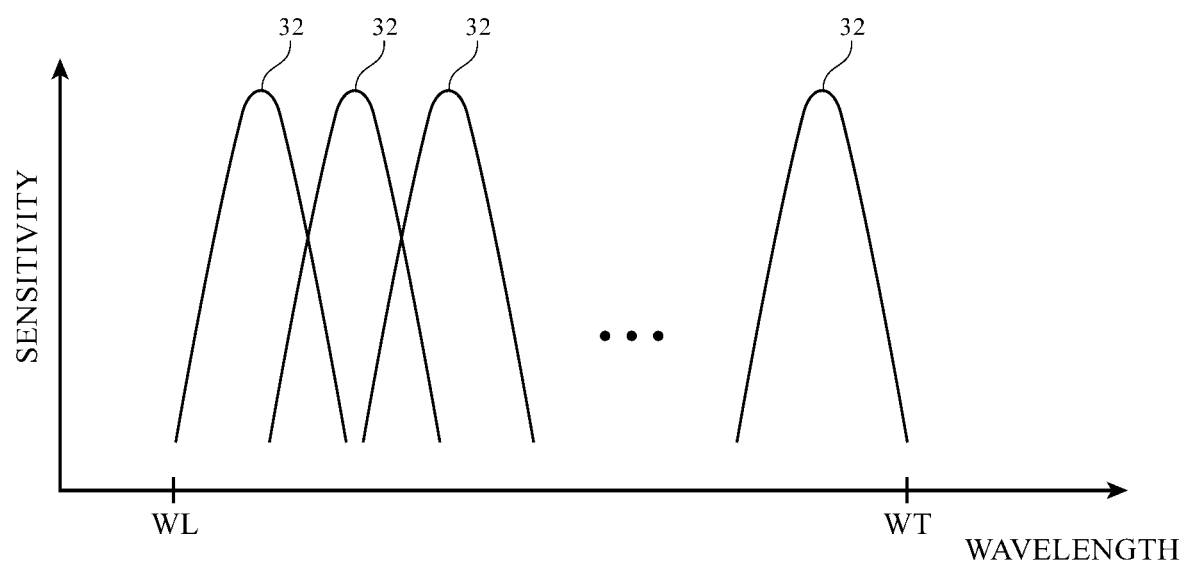
FIG. 4 is a graph showing how light sensor elements of different colors in a color ambient light sensor may have spectral responses that overlap in accordance with an embodiment.

If desired, the sensitivity profiles of each of light sensor elements 20E may overlap, as illustrated by light sensor element profiles (spectra) 32 of FIG. 4. In the graph of FIG. 4, light sensor sensitivity (e.g., output current as a function of input light intensity) has been plotted as a function of light wavelength. Spectra 32 each have a different sensitivity peak and overlap at least somewhat so that sensor 20 can cover a desired range of wavelengths from lower wavelength WL to upper wavelength WT. The color of ambient light may be determined by determining the relative strengths of the signals measured by each of the sensors 20E. Ambient light intensity may be measured by combining these color-specific measurements into a single total ambient light intensity reading (by combining sensor currents and/or by digitally combining sensor readings). The wavelength range of coverage for sensor 20 (i.e., the wavelength range WL-WT) may be entirely in the visible range and/or may penetrate partway into infrared and/or ultraviolet bands. Configurations in which there are wavelengths (e.g., wavelength range gaps) at which the sensitivity of sensor 20 is lower than at other wavelengths may also be used. The illustrative arrangement of FIG. 4 in which light sensor element profiles 32 overlap and provide continuous coverage from WL to WT is merely illustrative.

Input-output devices 24 may include one or more displays such as display 14. Control circuitry 22 may be used to run software on device 10 such as operating system code and applications. During operation of device 10, the software running on control circuitry 22 may display images on display 14 using an array of pixels in display 14. The software running on control circuitry 22 may, for example, gather color ambient light sensor information (color and/or luminance information) and may use this information in adjusting display attributes for images on display 14 (e.g., image brightness and/or image color contrast). Other suitable actions may also be taken based on measured color ambient light sensor information (e.g., color ambient light sensor information may be displayed for a user, alerts may be issued based on comparison of measured color ambient light sensor information to threshold values, etc.).

Figure 5:
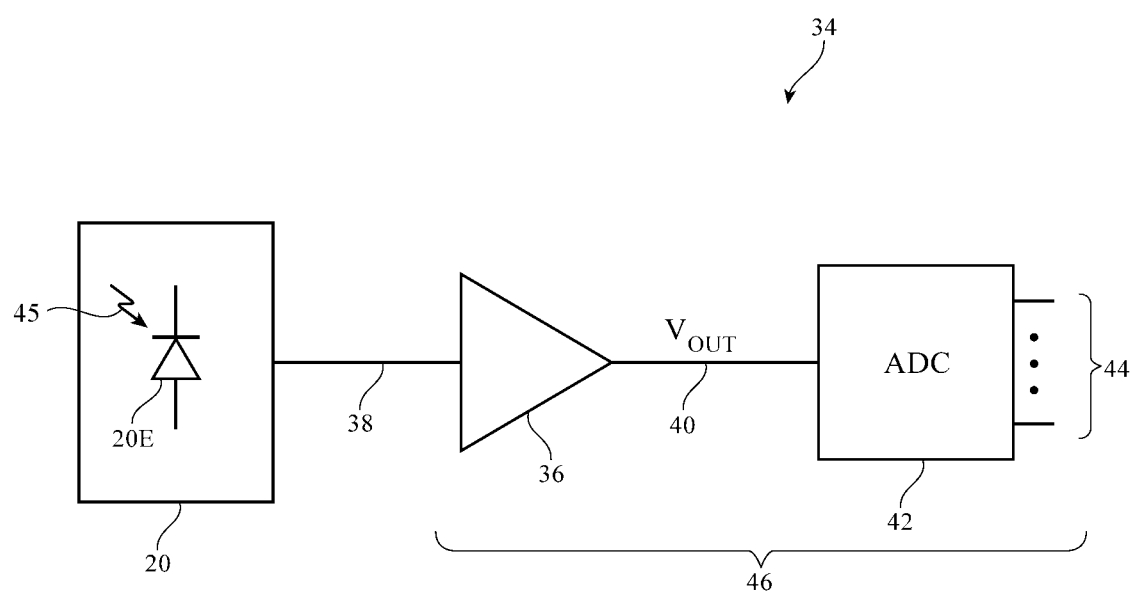
FIG. 5 is a circuit diagram of circuitry of the type that may be used in gathering light sensor signals from an array of light sensor elements of different colors in a color ambient light sensor in accordance with an embodiment.

FIG. 5 is a diagram of illustrative circuitry of the type that may be used in gathering sensor data with a sensor element 20E in sensor 20. In the illustrative example of FIG. 5, sensor 20 includes a single sensor element 20E that produces current on path 38 in response to received ambient light 45. Analog-to-digital converter circuit 46 may be used in digitizing the output (current signal) from light sensor element 20E. Circuit 46 may include circuitry 36 and 42.

Circuitry 36 (e.g., a transimpedance amplifier) may be used to convert current signals on path 38 into corresponding voltage signals Vout on path 40. Analog-to-digital converter 42 may have an input that receives analog voltage signals Vout and a corresponding output 44 at which a digital signal representing a digitized version of the sensor element reading from element 20E is presented. In a configuration with multiple sensor elements 20E, measurements from each of the sensor elements 20E may be evaluated to determine the color and intensity (luminance) output for sensor 20. The configuration of FIG. 5 in which circuitry 36 and 42 is being used to process measurements from a single color sensor element 20E is merely illustrative.

If a user's finger or other external object obscures part of sensor 20, sensor 20 may produce erroneous readings. For example, if a blue color sensor element 20E is obscured, color measurements from sensor 20 may be abnormally warm (yellowish) or if a yellow color sensor element 20E is obscured, color measurements from sensor 20 may be abnormally cold (bluish). To ensure that color measurements are accurate, control circuitry in device 10 may process signals from sensor elements 20E to determine whether any part of sensor 20 (e.g., any of sensor elements 20E) appear to be blocked. If signals are obscured in a portion of sensor 20, the control circuitry 22 can ignore the light sensor readings and can instead use default readings or historical readings in controlling device 10.

Figure 6:
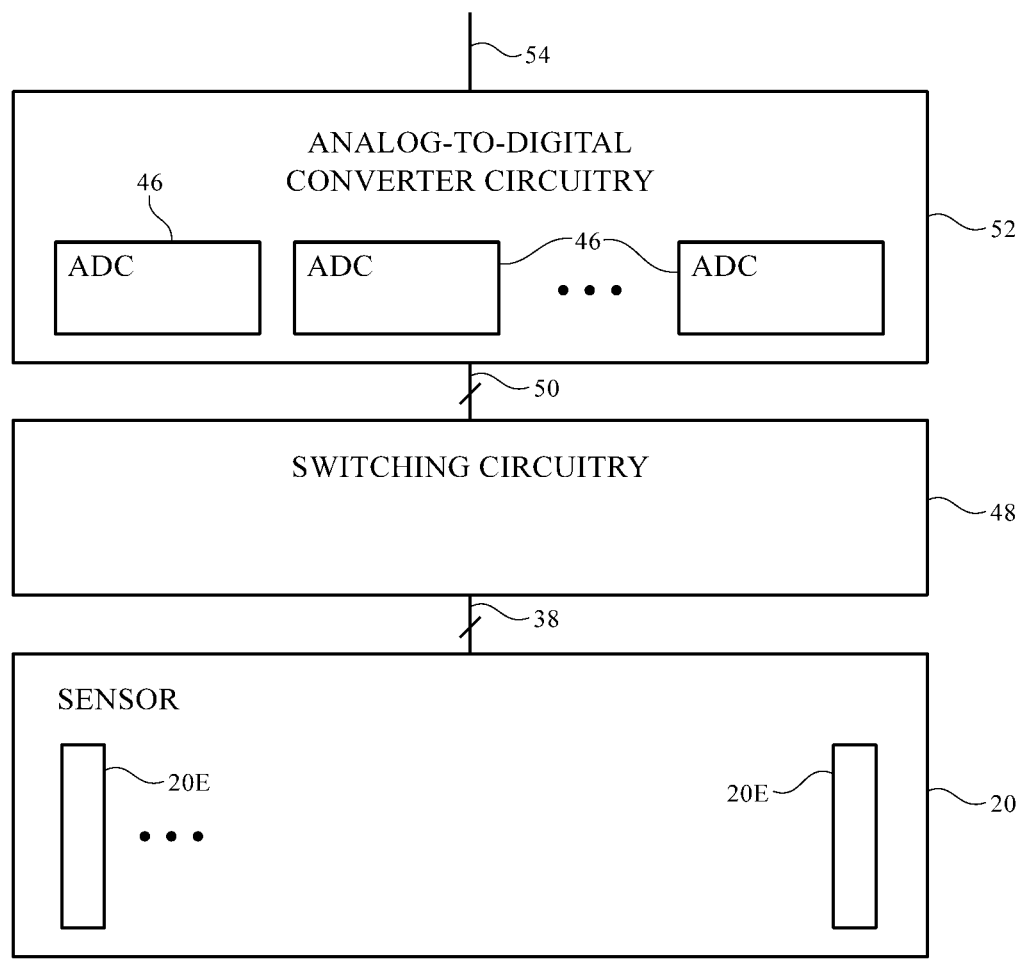
FIG. 6 is circuit diagram of illustrative circuitry that may be used in gathering light sensor information from a multichannel light sensor in accordance with an embodiment.

Illustrative circuitry of the type that may be used to gather information from sensor elements 20E for processing is shown in FIG. 6. As shown in FIG. 6, sensor 20 may have multiple sensor elements 20E. Sensor elements 20E may include sensor elements of different colors (i.e., sensitivity profiles that peak at different wavelengths in the visible light spectrum, etc.), as shown in FIG. 4. There may be one or more sensor elements 20E for each different wavelength range of interest. For example, in a sensor with sensor elements of three colors (e.g., red, green, and blue), there may be one or more red sensor elements, one or more green sensor elements, and one or more blue sensor elements). In general, there may be any suitable number of sensor elements 20E of different colors. There may be, for example, 2-10 different colors of sensor elements 20E, two or more different colors of sensor elements 20E, three or more different sensor element colors, four or more different sensor element colors, more than five sensor element colors, six or more than six sensor element colors, fewer than ten sensor element colors, 5-10 different colors of sensor elements 20E, etc. There may, in turn, be 1-3, 2-5, more than two, fewer than five, or other suitable number of sensor elements 20E of each of these different colors in sensor 20. In some situations, sensor elements 20E may include white light sensor elements (i.e., clear sensor elements that measure light intensity over all visible wavelengths or other wavelengths of interest).

Sensor elements 20E of sensor 20 may supply output signals to switching circuitry 48 using signal lines (see, e.g., path 38). Switching circuitry 48 may contain signal paths and switches (e.g., transistor-based switches) that are controlled by control signals from control circuitry 22. Switching circuitry 48 may be coupled to analog-to-digital converter circuitry 52 via signal lines (see, e.g., path 50). Analog-to-digital converter circuitry 52 may include multiple analog-to-digital converter circuits 46 each of which may include a transimpedance amplifier such as transimpedance amplifier 36 of FIG. 5 and an analog-to-digital converter such as converter 42 of FIG. 5. Each analog-to-digital converter circuit 46 (which may sometimes be referred to as forming an analog-to-digital converter channel), may be used in digitizing a separate respective current signal from one or more sensor elements 20E. Switching circuitry 48 may be use to route the current signals to respective analog-to-digital converter circuits 46.

In some configurations, there may be a sufficient number of analog-to-digital converter circuits 46 so that each sensor element 20E may simultaneously provide output signals to a respective analog-to-digital converter circuit 46 in parallel. In this type of arrangement, switching circuitry 48 can be omitted and sensor signals from elements 20E processed digitally. To ensure sensor accuracy, sensor data from sensors 20E can be processed by circuitry 22 to determine whether there are any unexpected variations in intensity across sensor 20 that indicate that sensor 20 is being obscured by a user's finger or other external object. If sensor 20 is not being obscured, the data from the sensor elements 20E may be processed by circuitry 22 to produce ambient light sensor color and luminance data. Suitable action may then be taken based on the color and luminance data.

To conserve resources, it may be desirable to provide circuitry 52 with a reduced number of analog-to-digital converters 46. For example, there may be fewer analog-to-digital converters 46 in circuitry 52 than sensor elements 20E in sensor 20. In this type of configuration, switching circuitry 48 may be placed in different configurations to either evaluate sensor non-uniformity (partial blocking) or to gather color and luminance readings.

For example, switching circuitry 48 may be placed in a first configuration in which sensor element signals are gathered to produce ambient light color and luminance measurements and may be placed in a second configuration in which position-sensitive sensor element readings are gathered to determine whether part of sensor 20 (e.g., at least one sensor element 20E on one of the ends of the array of sensor elements 20E in sensor 20) is being obscured. If sensor elements 20E are not being obscured, circuitry 22 can confidently use the color and luminance measurements that have been gathered.

In the first configuration for switching circuitry 48, sensor data from sensor elements 20E may be combined according to sensor element color to conserve analog-to-digital converter resources. For example, red sensor signals (i.e., the currents from red sensor elements 20E) may be combined and routed to a first analog-to-digital converter 46 via switching circuitry 48, green sensor signals (i.e., the currents from green sensor elements 20E) may be combined and routed to a second analog-to-digital converter 46 via switching circuitry 48, etc. Red sensor data may then be gathered by digitizing the combined red sensor element current, green sensor data may be gathered by digitizing the combined green sensor element current, etc. By gathering a different signal for each of the different colors of elements 20E in sensor 20, color and luminance information can be derived from the sensor measurements.

In the second configuration, switching circuitry 48 may be reconfigured to route signals from sensor elements 20E to analog-to-digital converter circuits 46 in a pattern that preserves sensor element location information. In this way, control circuitry 22 can determine (using the digitized sensor information on path 54 from analog-to-digital converter circuitry 52) whether there are variations in intensity across sensor 20 that depend on location and are indicative of shadowing by a user's finger or other external object (i.e., sensor element output signal variations of more than 5% in intensity or other suitable threshold amount). If data processing reveals that sensor elements 20E are not obscured (i.e., the illumination of sensor 20 is uniform across elements 20E), the sensor data can be trusted. If data processing reveals that sensor elements 20E are at least partly obstructed (i.e., sensor elements 20E are being non-uniformly illuminated), the readings from sensor 20 can be momentarily ignored. Once processing reveals that the variation in signal intensity across elements 20E at different locations is no longer present, control circuitry 22 can again trust the sensor data from sensor 20.

Figure 7:
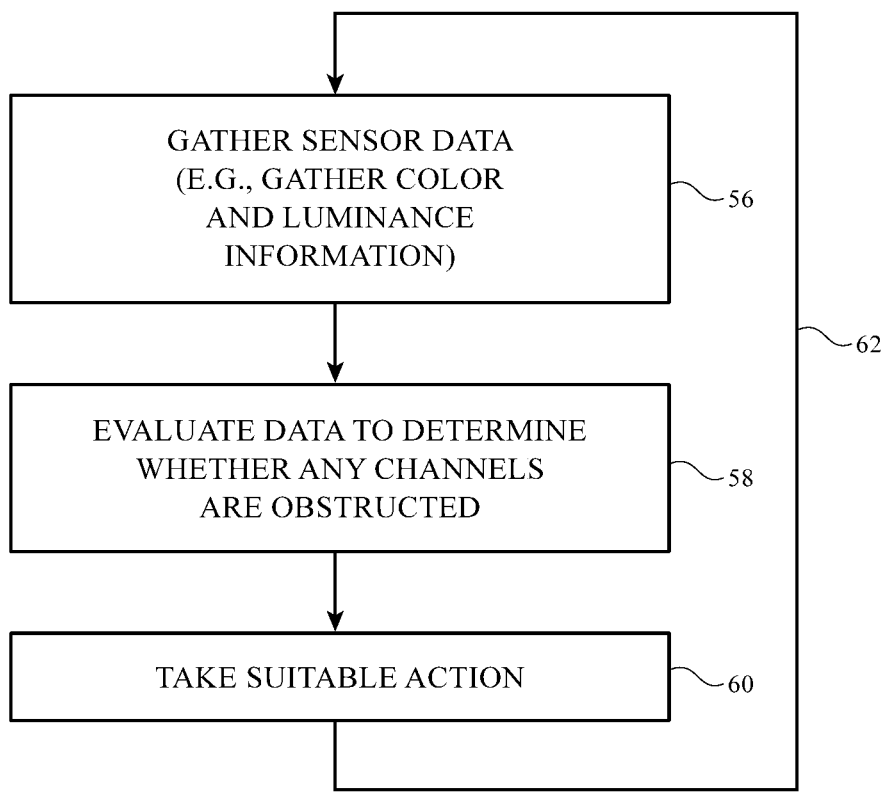
FIG. 7 is a flow chart of illustrative steps involved in gathering and processing sensor data in accordance with an embodiment.

FIG. 7 is a flow chart of illustrative steps involved in operating device 10 using circuitry of the type shown in FIG. 6. At step 56, switching circuitry 48 may be placed in a configuration that allows analog-to-digital converter circuits 46 to gather separate output signals for each of the different colors of sensor elements 20E of sensor 20 (i.e., a separate signal for each spectral profile 32 of FIG. 4). In arrangements in which there are multiple elements 20E associated with a given color (i.e., a given spectral sensitivity profile 32), circuitry 48 may combine the signals from each of those elements 20E onto a single input path for a single respective analog-to-digital converter circuit 46. The sensor element data from sensor elements 20E may be digitized by circuitry 52 and provided to control circuitry 22 for processing. Switching circuitry 48 may then be placed in a configuration that allows position sensitive information to be extracted from sensor elements 20E of sensor 20. In particular, circuitry 48 may be configured to route signals from sensor elements 20E to analog-to-digital converter circuits 46 in a pattern that allows circuitry 22 to determine whether signals at different locations along the length of sensor 20 (i.e., along its longitudinal axis) are varying more than expected.

Circuitry 22 may be configured to perform uniformity detection operation at step 58. During the processing operation of step 58, which may sometimes be referred to as gradient detection, non-uniformity detection, occlusion detection, or obstruction detection, circuitry 22 may process the data received from sensor elements 20E when switching circuitry 48 is in the configuration that allows sensor element location information to be extracted from sensor elements 20E. In performing non-uniformity detection, for example, circuitry 22 can compare the relative intensities of the signals from different sets (segments) of sensors 20E along the length of sensor 20. If it is determined that the lowest output from sensors 20E (i.e., the output of one or more sensors 20E at a given end of sensor 20) is more than 5% less (or other suitable amount less) than the largest output from sensors 20E (i.e., the output of one or more corresponding sensors 20E at a different portion of sensor 20 such as at the middle of sensor 20 or at an opposing end of sensor 20), or if other criteria are satisfied that are indicative of sensor element non-uniformity that is indicative of sensor obstruction, circuitry 22 can conclude that the user's finger or other external object is shadowing one or more of sensors 20E (e.g., one or more of sensors 20E at the given end of the sensor are being blocked). In this scenario, color and luminance information from sensor 20 may not be accurate, because part of sensor 20 is being obstructed. Each set of sensor elements 20E may have two or more sensor elements of different colors, three or more sensor elements of different colors, four or more sensor elements of different colors, five or more sensor elements of different colors, six or more sensor elements of different colors, etc.

At step 60, control circuitry 22 can take suitable action based on the sensor data and/or the outcome of the non-uniformity test. For example, if it was determined from the operations of steps 56 and 58 that the color and luminance data from sensor 20 is trustworthy, circuitry 22 can adjust display brightness and/or color for display 14 based on the color and luminance information from color ambient light sensor 20 or may otherwise take action based on the data from color ambient light sensor 20. If, on the other hand, an obstruction of sensor 20 was detected, circuitry 22 can decline to make any brightness and/or color adjustments to display 14 and/or can use other color ambient light sensor information in making these adjustments. For example, circuitry 22 can revert to using default color and luminance settings (e.g., average values) and/or can use historical color and luminance data (e.g., an average of the last five accurate readings from sensor 20, the last reading from sensor 20, etc.). Processing may then loop back to step 56, as indicated by line 62.

Figure 8:
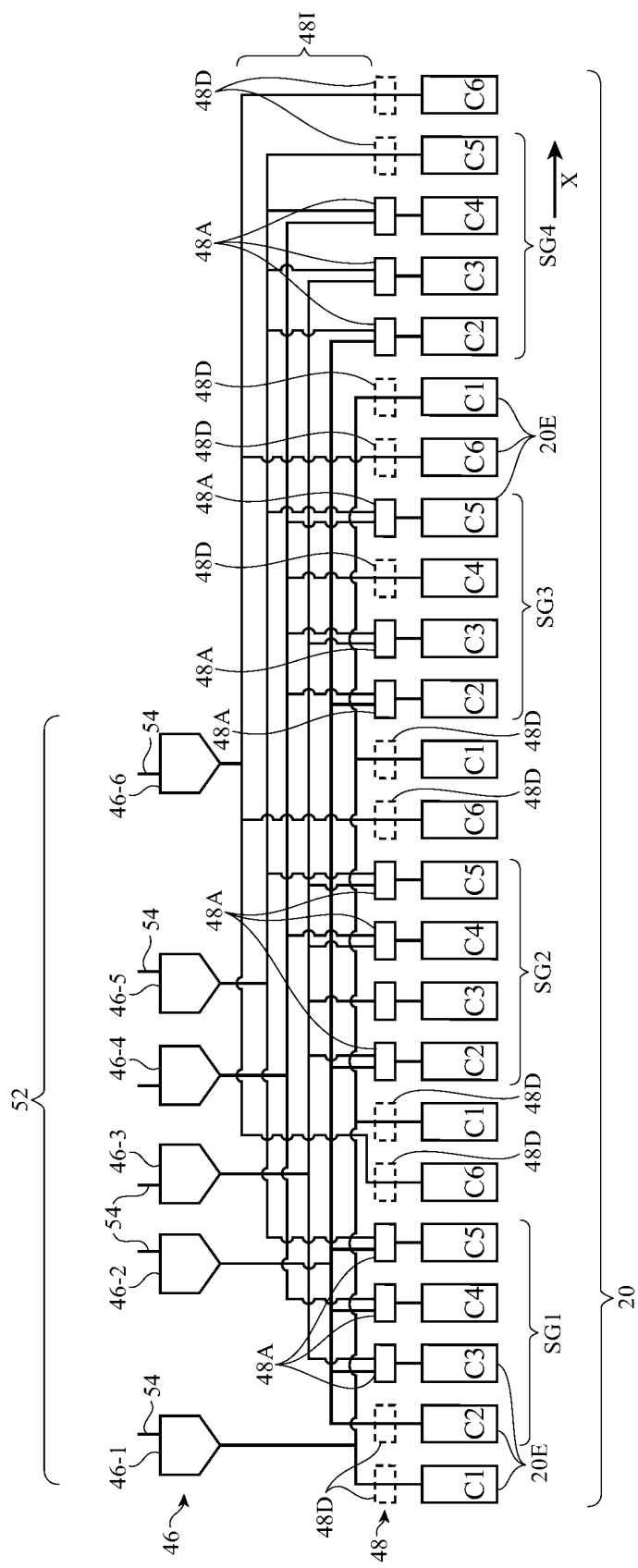
FIG. 8 is an array of light sensor elements in a color ambient light sensor and associated circuitry for gathering signals from the light sensor elements in an electronic device in accordance with an embodiment.

FIG. 8 is a circuit diagram showing illustrative circuitry of the type that may be used to implement sensor 20, switching circuitry 48, and analog-to-digital converter circuitry 52 of FIG. 6. As shown in FIG. 8, sensor 20 may include multiple sensor elements 20E. Sensor elements 20E may, for example, be arranged in a linear array (i.e., a row of sensor elements 20E in an elongated sensor configuration) that extends along dimension X (i.e., a dimension parallel to the longitudinal axis of sensor 20). The length of sensor 20E along dimension X may be 2.5 mm, may be 2-3 mm, may be more than 1 mm, may be less than 5 mm, or may be any other suitable length. The width of sensor 20 (i.e., the longer dimension of each element 20E) may be about 0.45 mm, 0.3-0.6 mm, more than 0.2 mm, more than 0.1 mm, less than 1 mm, less than 4 mm, or other suitable width. Non-rectangular shapes for sensor elements 20E and for sensor 20 may be used, if desired. The illustrative configuration of sensor 20 in FIG. 8 is shown as an example.

Switching circuitry 48 may include switches 48A and signal routing paths 48I (sometimes referred to as lines, signal paths, interconnects, etc.). Switches 48A and paths 48I may be used to couple various sets of sensor elements 20E to respective analog-to-digital converter circuits 46. Analog-to-digital converter circuitry 52 may use analog-to-digital converters 46 to provide digitized sensor signals to control circuitry 22 via path(s) 54. There are 24 sensor elements 20E with six different spectral response profiles 32 (sensor element colors C1, C2, C3, C4, C5, and C6) and six analog-to-digital converter circuits 46 (i.e., analog-to-digital converter circuits 46-1, 46-2, 46-3, 46-4, 46-5, and 46-6) in the example of FIG. 8. Sensor elements 20E are arranged so that the six colors of elements 20E repeat along the length of sensor 20 in dimension X. This arrangement is merely illustrative. Other numbers of sensor elements 20E and/or analog-to-digital converter circuits 46 may be used and different patterns of colors may be used, if desired.

Switches 48A each have a first terminal coupled to a respective sensor element 20E and have second and third terminals to which the first terminal can be selectively coupled in response to control signals from control circuitry 22. As shown in FIG. 8, the second and third terminals of switches 48A may be coupled to paths 48I so that signals can be routed to analog-to-digital converter circuits 46 in different patterns. Some of sensor elements 20E may be coupled to routing paths 48I without passing through any actively controlled switches 48A. To equalize capacitive loading between these sensor elements 20E and the sensor elements coupled to switches 48A, switching circuitry 48 may be provided with dummy switches 48D (i.e., switch structures that are similar or identical to switches 48A, but which are not actively switched by control circuitry 22).

In a normal operating mode (sometimes referred to as ambient light color sensing mode), paths 48I and switches 48A may be configured to group sensor elements 20E in six different sets, each with four elements 20E of the same color. The output (current) from the sensor elements 20E in each of these six different sets of four elements 20E is routed to a different respective analog-to-digital converter circuit 46. For example, the signals from the four elements 20E of color C1 in FIG. 8 are all routed to analog-to-digital converter circuit 46-1, the four elements 20E of color C2 are coupled to analog-to-digital converter circuit 46-2, the four elements 20E of color C3 are coupled to analog-to-digital converter circuit 46-3, the four elements 20E of color C4 are coupled to analog-to-digital converter circuit 46-4, the four elements 20E of color C5 are coupled to analog-to-digital converter circuit 46-5, and the four elements 20E of color C6 are coupled to analog-to-digital converter circuit 46-6. In general, any suitable number of elements of the same color may be included in each set of elements 20E, e.g., three or more elements 20E of the same color, four or more elements 20E of the same color, fewer than ten elements 20E of the same color, etc. The use of four commonly colored elements 20E in each of the six illustrative sets of elements 20E in the example of FIG. 8 is illustrative.

In a second mode (sometimes referred to as non-uniformity detection mode or sensor illumination non-uniformity detection mode), sensor elements 20E are organized in four different sets (segments SG1, SG2, SG3, and SG4) each of which is located at a different position along the length of sensor 20 (i.e., a different location in dimension X). Some of the sensor elements 20E of sensor 20 are not included in these four sets and serve as unused buffer sensor elements during non-uniformity detection operations. During non-uniformity detection mode, switches 48A are configured to route sensor signals (current) from each of the four sets of sensor elements 20E to a respective one of four of analog-to-digital converter circuits 46. In the illustrative arrangement of FIG. 8, each of the sensor elements 20E in segment SG1 is coupled to analog-to-digital converter circuit 46-2, each of sensor elements 20E in segment SG2 is coupled to analog-to-digital converter circuit 46-3, each of the sensor elements 20E in segment SG3 is coupled to analog-to-digital converter circuit 46-4, and each of the sensor elements 20E in segment SG4 is coupled to analog-to-digital converter circuit 46-5. Each of the four segments (sets) includes elements of colors C2, C3, C4, and C5, so that the spectral response of each of the segments is the same (and may cover all or part of the visible spectrum or other suitable wavelength range).

By comparing the intensity of the signal from each segment, segments that are obscured by a user's finger or other external object can be identified (i.e., non-uniform ambient light illumination conditions can be detected) and appropriate corrective action taken (e.g., by ignoring data from sensor 20 until a uniform condition is detected, etc.). In general, any suitable number of elements of different colors that are clustered together at different locations to provide position information within sensor 20 may be included in each set of elements 20E during non-uniformity detection mode (e.g., two or more elements 20E of different colors, three or more elements 20E of different colors, four or more elements 20E of different colors, fewer than ten elements 20E of different colors, representative elements 20E of a single color—i.e., solitary elements 20E each forming a single color set, etc.). The use of four colored elements 20E (with colors C2, C3, C4, and C5) in each of four illustrative sets (segments) of elements 20E in the configuration of FIG. 8 is illustrative.

Figure 9:
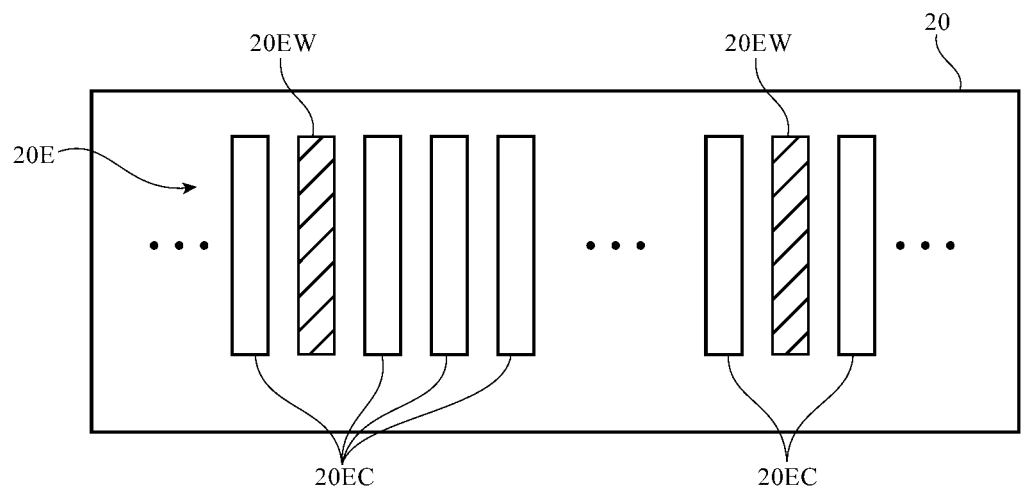
FIGS. 9 and 10 are diagrams showing how dummy ambient light sensor elements may be incorporated into a color ambient light sensor to monitor for obstruction of ambient light sensor elements in accordance with an embodiment.
Figure 10:
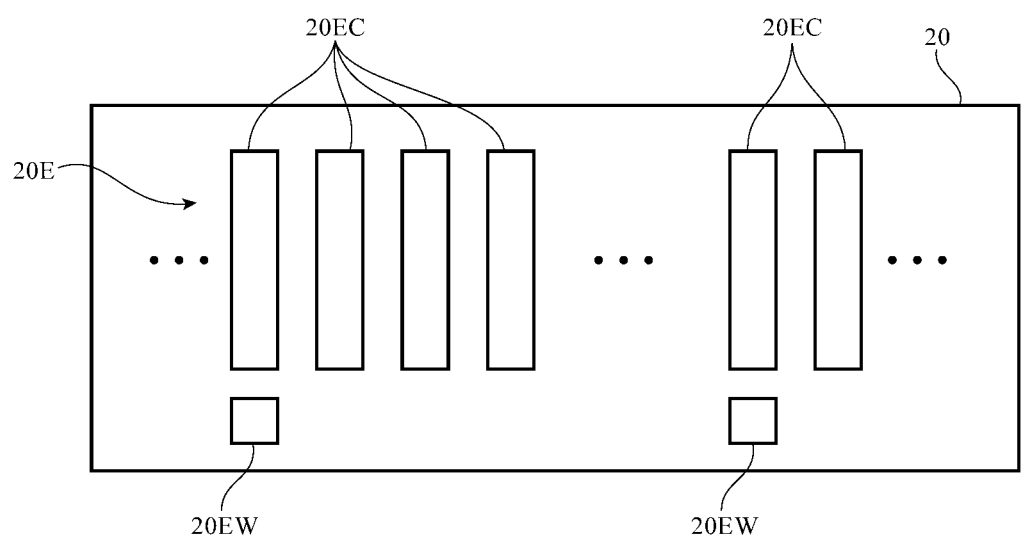

If desired, circuitry 22 can detect non-uniform illumination conditions using additional sensor elements such as white (clear) sensor elements that have broad spectral profiles (e.g., spectral responses that cover all or most of the visible light spectrum and, if desired, that extend into infrared and/or ultraviolet wavelengths). As an example, clear sensor elements 20EW may be interspersed with colored sensor elements 20EC along the length of sensor 20 as shown in FIG. 9. In the illustrative configuration of FIG. 10, sensor 20 includes a row of colored elements 20EC for making color ambient light sensor measurements and has a supplemental row of clear elements 20EW. In these types of arrangements, the outputs from sensors 20EW may be processed by circuitry 52 and circuitry 22 to determine whether a non-uniform lighting condition exists for sensor 20 (i.e., whether part of sensor 20 has been obscured by an external object). During normal operation, sets of commonly colored sensor elements 20EC may be routed to respective analog-to-digital converter circuits 46, as described in connection with FIG. 7.

The foregoing is merely illustrative and various modifications can be made by those skilled in the art without departing from the scope and spirit of the described embodiments. The foregoing embodiments may be implemented individually or in any combination.

What is claimed is:

1. Color ambient light sensor circuitry, comprising:
    a color ambient light sensor having a first set of light sensor elements of a first color and a second set of light sensor elements of a second color, wherein the first set of light sensor elements includes first and second light sensor elements and wherein the second set of light sensor elements includes third and fourth light sensor elements;
    analog-to-digital converter circuits that digitize signals from the light sensor elements;
    control circuitry that processes the signals from the light sensor elements to determine whether the signals are uniform; and
    switching circuitry coupled between the light sensor elements and the analog-to-digital converter circuits, wherein the switching circuitry is selectively configured to:
        route signals to a first given one of the analog-to-digital converter circuits from the first and second light sensor elements and route signals to a second given one of the analog-to-digital converter circuits from the third and fourth light sensor elements while the switching circuitry is operated in an ambient light color measurement mode; and
        route signals to the first given one of the analog-to-digital converter circuits from the first and third light sensor elements and route signals to the second given one of the analog-to-digital converter circuits from the second and fourth light sensor elements while the switching circuitry is operated in a sensor illumination non-uniformity detection mode.

2. The color ambient light sensor circuitry defined in claim 1 wherein the first set of light sensor elements and the second set of light sensor elements are arranged in a row in the color ambient light sensor.

3. The color ambient light sensor circuitry defined in claim 2 wherein the first set of light sensor elements include light sensor elements of at least a third additional color and a fourth additional color.

4. The color ambient light sensor circuitry defined in claim 3 wherein each analog-to-digital converter circuit has a respective transimpedance amplifier that converts current from the first set of light sensor elements and the second set of light sensor elements to voltage and wherein there are fewer analog-to-digital converter circuits than light sensor elements.

5. The color ambient light sensor circuitry defined in claim 4 wherein the first set of light sensor elements includes at least four light sensor elements.

6. The color ambient light sensor circuitry defined in claim 5 the second set of light sensor elements includes at least three light sensor elements.

7. The color ambient light sensor circuitry defined in claim 1 wherein the switching circuitry comprises:
    switches; and
    signal paths, wherein the switches and signal paths are coupled between the light sensor elements and the analog-to-digital converter circuits.

8. The color ambient light sensor circuitry defined in claim 7 wherein the switches are controlled by control signals when transitioning the switching circuitry between operating in the ambient light color measurement mode and operating in the sensor illumination non-uniformity detection mode, the color ambient light sensor circuitry further comprising dummy switches coupled within the signal paths that are not switched when transitioning the switching circuitry between operating in the ambient light color measurement mode and operating in the sensor illumination non-uniformity detection mode.

9. The color ambient light sensor circuitry defined in claim 7 wherein at least some of the light sensor elements are interposed between the second sets of light sensing elements and do not supply current to the analog-to-digital converter circuits during the sensor illumination non-uniformity detection mode.

10. The color ambient light sensor circuitry defined in claim 9 wherein the light sensor elements comprise light sensor elements of at least six different colors.

11. An electronic device, comprising:
    a housing;
    a display mounted in the housing;
    an elongated color ambient light sensor that makes color and luminance ambient light measurements through an inactive area of the display, wherein the color ambient light sensor comprises a row of light sensor elements of different colors;
    control circuitry that processes ambient light sensor signals from the elongated color ambient light sensor to determine whether part of the color ambient light sensor is obstructed by an external object, wherein the control circuitry comprises analog-to-digital converter circuits coupled to the color ambient light sensor that receive current signals from the light sensor elements;
    switching circuitry that couples the row of light sensor elements of different colors to the analog-to-digital converter circuits, wherein the switches are operated by control signals; and
    dummy switches coupled between at least one of the light sensor elements and the analog-to-digital converter circuits, wherein the dummy switches are not actively switched by the control circuitry.

12. The electronic device defined in claim 11 wherein each of the analog-to-digital converter circuits includes a transimpedance amplifier and wherein there are fewer analog-to-digital converter circuits coupled to the color ambient light sensor than light sensor elements in the color ambient light sensor.

13. An electronic device, comprising:
    a housing;
    a display in the housing;

color ambient light sensor circuitry that makes color and luminance measurements on ambient light, wherein the color ambient light circuitry has an array of light senor elements of different colors that generate current in response to ambient light, wherein the array of light sensor elements includes first and second light sensor elements of a first color and third and fourth light sensor elements of a second color; and control circuitry that adjusts the display based on the color and luminance measurements, wherein the color ambient light sensor circuitry has switching circuitry and has analog-to-digital converter circuits to which the light sensor elements are coupled by the switching circuitry, wherein each of the analog-to-digital converter circuits has a transimpedance amplifier that converts current from the light sensor elements to a corresponding voltage, wherein a first analog-to-digital converter circuit receives signals from the first and second light sensor elements and a second analog-to-digital converter circuit receives signals from the third and fourth light sensor elements in response to operating the switching circuitry in an ambient light color measurement mode, and wherein the first analog-to-digital converter circuit receives signals from the first and third light sensor elements and the second analog-to-digital converter circuit receives signals from the second and fourth light sensor elements in response to operating the switching circuitry in a sensor illumination non-uniformity detection mode.

14. The electronic device defined in claim 13 wherein there are fewer analog-to-digital converter circuits coupled to the light sensor elements of the color ambient light sensor circuitry than there are light sensing elements in the color ambient light sensor circuitry.

15. The electronic device defined in claim 14 wherein the array of light sensing elements includes at least six different colors of light sensing elements and wherein at least four of the light sensing elements of the at least six different colors of light sensing elements are sampled in a sensor illumination non-uniformity detection mode.

\* \* \* \* \*